(12) United States Patent
Nakamoto et al.

(10) Patent No.: US 9,948,675 B2
(45) Date of Patent: Apr. 17, 2018

(54) IDENTITY-BASED INTERNET PROTOCOL NETWORKING

(71) Applicant: The MITRE Corporation, McLean, VA (US)

(72) Inventors: Shu Nakamoto, East Wakefield, NH (US); Robert C. Durst, Oakton, VA (US); Randy Quang, Millbury, MA (US); David Pisano, Westford, MA (US); Jiemei Ma, McLean, VA (US); Jason R. Andresen, Herndon, VA (US); Nirav Trivedi, Falls Church, VA (US); Christopher C. Growney, Falls Church, VA (US); Jerod M. Parker, Annandale, VA (US)

(73) Assignee: THE MITRE CORPORATION, McLean, VA (US)

( * ) Notice: Subject to any disclaimer, the term of this patent is extended or adjusted under 35 U.S.C. 154(b) by 0 days.

(21) Appl. No.: 13/856,842

(22) Filed: Apr. 4, 2013

(65) Prior Publication Data
US 2014/0304765 A1 Oct. 9, 2014

(51) Int. Cl.
*G06F 17/00* (2006.01)
*H04L 29/06* (2006.01)

(52) U.S. Cl.
CPC .......... *H04L 63/20* (2013.01); *H04L 63/0823* (2013.01); *H04L 63/14* (2013.01)

(58) Field of Classification Search
CPC ... H04L 63/20; H04L 63/102; H04L 63/0227; G06F 21/6218; G06F 21/604
USPC ......... 713/168–174, 182–186, 202; 709/206, 709/225, 229, 249, 389; 726/2–8, 1
See application file for complete search history.

(56) References Cited

U.S. PATENT DOCUMENTS

| 8,190,734 | B2 | 5/2012 | Cooper |
| 2005/0180422 | A1 | 8/2005 | Boodaghians et al. |
| 2009/0300711 | A1* | 12/2009 | Tokutani ............... G06F 21/554 726/1 |
| 2009/0307751 | A1* | 12/2009 | Lin ....................... H04L 63/101 726/3 |
| 2012/0063314 | A1* | 3/2012 | Pignataro ............ H04L 12/4633 370/235 |

(Continued)

FOREIGN PATENT DOCUMENTS

EP      2 485 442 A1      8/2012

OTHER PUBLICATIONS

International Search Report and Written Opinion, dated Aug. 19, 2014, for PCT Appl. No. PCT/US2014/032535, filed Apr. 1, 2014, 12 pages.

(Continued)

*Primary Examiner* — Evans Desrosiers
(74) *Attorney, Agent, or Firm* — Sterne, Kessler, Goldstein & Fox P.L.L.C.

(57) ABSTRACT

A network architecture that eliminates anonymous traffic, reduces a threat surface, and enforces policies is described herein. A method based on this network architecture includes receiving, by a processor, an IP packet entering a network, inserting, by the processor, an identity-based internet protocol (IBIP) shim between a header and a body of the IP packet and incorporating, by the processor, an identity of a source and a destination of the IP packet in the shim.

32 Claims, 8 Drawing Sheets

(56) References Cited

U.S. PATENT DOCUMENTS

2013/0064247 A1* 3/2013 Song .................. H04L 12/4641
370/392
2013/0077630 A1 3/2013 Bejerano et al.

OTHER PUBLICATIONS

Nakamoto, G. et al., "Identity-Based Internet Protocol Network," The MITRE Corporation, 2012, 6 pages.
Barisch, M. et al. "Integrating User Identity Management Systems with the Host Identity Protocol," *IEEE Symposium on Computers and Communications*, 2009, pp. 830-836.
BlackRidge Technology Transport Access Control Brochure, 2012, 2 pages.
Lee, B. et al., "Mobile IP and WLAN with AAA Authentication Protocol using Identity-based Cryptography," *10th International Conference on Telecommunications*, 2003, pp. 597-603.
Nikander, P. et al., "Host Identity Protocol (HIP): Connectivity, Mobility, Multi-Homing, Security, and Privacy over IPv4 and IPv6 Networks," *IEEE Communications Surveys & Tutorials*, vol. 12, No. 2, Second Quarter 2010, pp. 186-204.

\* cited by examiner

IDENTITY-BASED INTERNET PROTOCOL NETWORKING

STATEMENT REGARDING FEDERALLY-SPONSORED RESEARCH AND DEVELOPMENT

Statement under M.P.E.P. § 310. The U.S. government has a paid-up license in this invention and the right in limited circumstances to require the patent owner to license others on reasonable terms as provided for by the terms of contract W15P7-12-C-F600 awarded by the United States Army.

Part of the work performed during development of this invention utilized U.S. Government funds. The U.S. Government has certain rights in this invention.

BACKGROUND

Field

The present embodiments relate generally to a network architecture that eliminates anonymous traffic, reduces a threat surface, and enforces policies.

Background

Conventional computer networks present a number of undesirable issues and challenges for network administrators. Conventional networks allow for easy addition and subtraction of devices. They also allow for dynamic changes and modifications to devices including software used on the devices. However, these benefits represent a double-edged sword, because they leave conventional networks vulnerable to attack by had actors. Enterprise networks that are based on conventional networks are often targeted because of their size and the plethora of easy targets they provide.

Such enterprise networks may include a variety of different devices and infrastructure that are difficult to protect. Attackers of enterprise networks may seek to compromise devices connected to the network, take down web services by way of attacks such as denial of service attacks, and/or steal confidential data such as passwords and other sensitive information. For networks such as those used by the U.S. military, the U.S. government or even hospitals, these attacks may present a life or death situation. Further, a banking network attack could cause bank accounts to be emptied in fractions of a second.

Many attacks succeed because they are "new" or variants on old attacks. Thus, because of the difficulty of defending from attacks which were previously unknown, most attacks are not addressed until after the fact. At that time, it may be too late to stop damage to a network and its infrastructure.

One example of unknown attacks include attacks using malware or malicious software such as computer viruses, worms, Trojan horses, spyware, adware, etc. Enterprise networks struggle to deal with malware.

There are many ways that malware can establish an initial foothold within a network. One such example is a "Zero Day" exploit, e.g. an unknown vulnerability in some aspect of a computer software application being executed on a device connected to the conventional network. These exploits are problematic because network operators as well as developers of the software application have no awareness of a "Zero Day" threat until such vulnerability is exploited.

In addition, many attacks come from within a network. Other attacks may appear to come from within a network, as a result of a malicious user obtaining access to compromised device connected to the network, or a user unintentionally opening up a network to harm.

Patches and network-related hygiene practices to stop malware and unpredictable security issues are reactive rather than proactive. Malware detection based on signatures is a losing proposition, and conventional signature detection methods are not viable options to stop future infections.

Accordingly, a new, proactive network model is needed to detect anomalous or malicious network activities and help mitigate the impact of malware on enterprise networks.

SUMMARY

Embodiments include an identity-based internet protocol system, method and computer program product. The system can be used for eliminating anonymous traffic, reducing a threat surface, and enforcing network policies based on a shim identifying a source and a destination of an IP packet.

In an embodiment, an identity-based internet protocol method includes receiving, by a processor, an IP packet entering a network. Next, the method includes inserting, by the processor, an identity-based internet protocol (IBIP) shim between a header and a body of the IP packet. The method further includes incorporating, by the processor, an identity of a source of the IP packet in the shim.

In a further embodiment, an identity-based internet protocol method includes receiving, by a processor, an IP packet exiting a network. Next, the processor interprets an identity-based internet protocol (IBIP) shim between a header and a body of the IP packet, the IBIP shim including an identity of a source and a destination of the IP packet. The processor enforces egress policies according to a policy monitor, and removes the IBIP shim from the IP packet. The IP packet is forwarded to the destination without the IBIP shim.

In another embodiment, an identity-based internet protocol system includes a policy enforcement point (PEP) configured to receive an IP packet entering a network. The PEP is configured to insert an identity-based internet protocol (IBIP) shim between a header and a body of the IP packet as well as incorporate an identity of a source and a destination of the IP packet in the shim. The PEP is further configured to remove the IBIP shim from an IP packet exiting the network as well as enforce ingress and egress policies. The system further includes a host device configured to receive the IP packet forwarded from the policy enforcement point responsive to the shim.

Further embodiments, features, and advantages, as well as the structure and operation of various embodiments, are described in detail below with reference to the accompanying drawings.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

The present embodiments will be described with reference to the accompanying drawings. The drawing in which an element first appears is typically indicated by the leftmost digit(s) in the corresponding reference number.

DETAILED DESCRIPTION

Overview

An identity-based internet protocol (IBIP) network is a network architecture designed to hide end user machines, make network infrastructure inaccessible to attack, eliminate anonymous traffic, self-configure, increase situational awareness and/or preserve investment in existing network infrastructure. According to example embodiments, the IBIP network architecture hides a majority of machines and devices connected to the network from unsolicited access (by enabling a "need-to-know" concept for access), enforces strong ubiquitous authentication for both host and user (preventing impersonation), and enables enforceable authorization policies for servers. Thus, according to example embodiments, the network is configured to be policy-driven in which all but initial, basic router settings are fully automated. In addition, the network itself has situational understanding and is able to address events and changes as they unfold. Any action that is not authorized by the IBIP network becomes a policy violation and can be monitored and permitted (permissive mode) or monitored and blocked (restrictive mode).

Conventional networks are reactive in nature and susceptible to "new" malware detected each day. In addition, conventional methods of protecting networks from malware will not be viable to stop future infections.

Network and host vulnerabilities have introduced a growing market for "Zero Day" vulnerabilities that may be exploited using a variety of delivery mechanisms. Thus, according to example embodiments, it is desirable to mitigate vulnerabilities using IBIP.

According to example embodiments, an objective of IBIP is to enhance network security while simultaneously preserving prior investment in existing network infrastructure. Advancing network security requires taking a step back from the current conventional approach and making changes to the status quo.

For example, first, the network should not allow anonymous traffic. Second, a threat surface of the network should be reduced by hiding client workstations and making network infrastructure inaccessible. Third, network services should have "permissible use" policies which are enforced by network infrastructure. Embodiments achieve one or more of the foregoing, and may achieve other objectives as described herein.

Example System Embodiments

Figure 1:
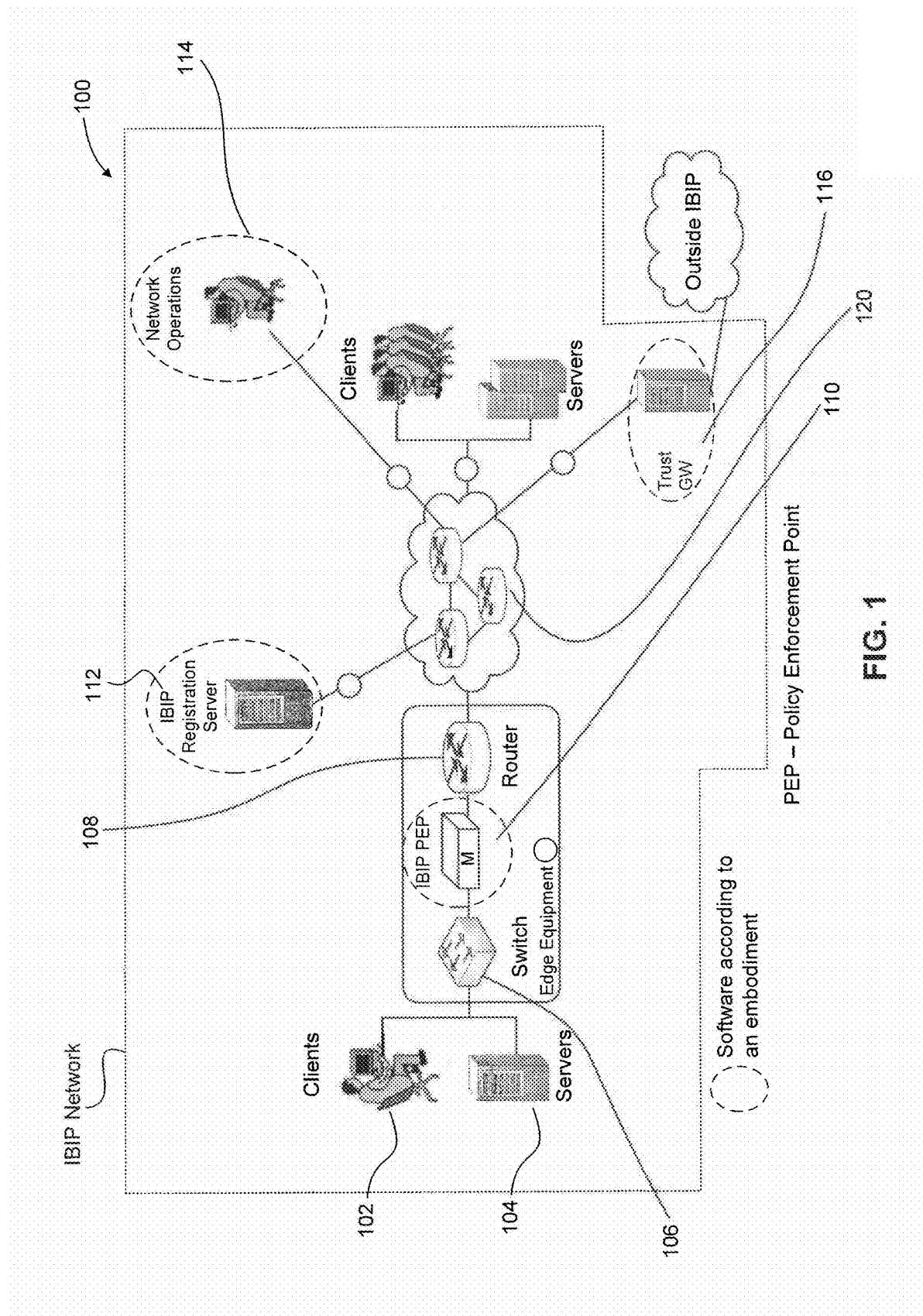
FIG. 1 is a system diagram of an example identity-based internet protocol network, according to example embodiments.

FIG. 1 is a system diagram of an example identity-based internet protocol (IBIP) network 100, according to example embodiments. The IBIP network 100 may support both IPv4 and IPv6 protocols and thus may be an IPv4 and/or an IPv6 network. Example network 100 may include clients 102 and servers 104. The clients 102 and servers 104 may be connected to a switch 106 which is in connection with a router 108. According to example embodiments, an IBIP policy enforcement point (PEP) 110 may be between the switch 106 and the router 108. The IBIP network may further include an IBIP registration server (RS) 112, a network operations system (NetOps) 114 and a trust gateway (TG) 116. According to embodiments, IBIP network 100 may not communicate outside of the IBIP network 100, i.e. with non-IBIP parts of an enterprise or the Internet, without using a trust gateway 116.

According to embodiments, an existing enterprise network or a portion of an existing enterprise network may be converted to an IBIP network. The IBIP network may be wholly contained within the enterprise network without direct access to the Internet except through an enterprise firewall. The IBIP network may be kept separate from the enterprise both cryptographically (to reduce an impact of physical misconfiguration such as being plugged into a wrong port) and logically—through the use of separate network prefixes to make unroutable within the enterprise network.

According to example embodiments, an IBIP network 100 utilizes edge switches 106, PEPs 110 and edge routers 108. The edge router 108 may be connected to the enterprise network and may be an endpoint of an IPsec tunnel. A plaintext side of the tunnel includes the private IBIP network 100 which may or may not be routable within the enterprise. The ciphertext side of the tunnel is an enterprise routable network. All IBIP edge routers 108 may be interconnected using the IPsec tunnel structure manually. Alternatively, IP-in-IP tunneling (such as generic route encapsulation or GRE tunneling) is a potential means of segregating IBIP from non-IBIP networks if confidentiality between the IBIP network and non-IBIP network is not required. Configuration actions include permitting the edge router 108 to connect to an enterprise router and provide appropriate network prefixes unique to IBIP to be assigned and routable toward the trust gateway 116. Thus, all traffic that is to be sent to the IBIP enclave will be routed through the trust gateway 116.

The enterprise may need to coordinate DNS services by creating a subdomain such as "ibip.mitre.org" for a split horizon DNS server that is aware of internal servers but is also an authoritative source for servers outside IBIP DNS queries. The enterprise DNS system is configured to understand this subdomain and is able to point to the subdomain. Alternatively, the first hop router within the IBIP network may be configured to use the non-IBIP DNS server if a subdomain configuration is not needed or desired.

DHCP service may also require configuration changes. In a non-IBIP environment embodiment, a MAC address is used to identify a network interface associated with a host and allow a DHCP IP address assignment. If a networkable device (desktop, laptop, tablet, cellular phone, etc.) is used in a conference room connected to an Ethernet port or wirelessly, the Media Access Control (MAC) address of a network interface is typically used for identification. However, if the portable device is connected to an Ethernet port that is part of the IBIP enclave, a local DHCP server may offer an IP address from a specific address pool provided by the enterprise for IBIP. The IP address may be associated with the "ibip.mitre.org" subdomain while inside the designated IBIP enclave, and the identifier presented to the DHCP server may be based on a Device Unique Identifier (DUID) derived from IBIP host credentials or on the MAC address of the network interface. The DHCP server will be configured with MAC addresses or DUIDs associated with the enclave to ensure that an enterprise policy is maintained. Alternatively, the first hop router may be configured to proxy all DHCP requests to the non-IBIP DHCP server if no IBIP specific subdomains are necessary or needed.

Edge Switch

In an embodiment, edge switch 106 in the IBIP network is a standard Ethernet switch that supports 802.1x security framework and private virtual local area network (VLAN) configuration. The switch 106 serves as a front line of defense providing authentication and network admission control. IBIP utilizes this security framework as well as VLAN and combines these with authentication provided by both host-based certificates or credentials and user-based certificates or credentials. Trusted Platform Module (TPM) and smart card technology may be used as mechanisms for storing such credentials. Within the 802.1x framework, the switch 106 acts as an authenticator or agent to help the host-based supplicant and the authentication server exchange extensible authentication process (EAP) messages. This authentication is discussed further below.

Edge Router

Edge router 108 may be known as an edge or first hop router. If the enterprise network is IBIP enabled, then the router 108 may function as a conventional edge router. However, if router 108 protects an IBIP cell as well as connects to another router 120 which connects to networks which are not part of the IBIP network 100 as shown in FIG. 1, then the IBIP domain may be segregated from networks which are not part of the IBIP network 100. According to example embodiments, router 108 may be configured to implement a full mesh IPsec or GRE (generic routing encapsulation) tunnel to other IBIP routers 120. This tunnel may create cryptographic separation as well as routing table segregation between the IBIP network 100 and the networks which are not part of the IBIP network. However, other means may be used to separate the IP network including MPLS (Multiprotocol Label Switching) or virtual route forwarding. The router 108 need not utilize tunneled connectivity if all connections in the network are through the IBIP network 100. Tunneling may permit incremental deployment of IBIP in local area network segments, e.g. IBIP cells. According to example embodiments, an IBIP cell may include the edge switch 106, the edge router 108 and the PEP 110.

Policy Enforcement Point (PEP)

According to example embodiments, an IBIP policy enforcement point 110 (PEP) is an additional hardware component of the network 100. As an example, the PEP 110 may be an inline layer two or three infrastructure device enforcing policy for network traffic in an IBIP enclave. For instance, the PEP 110 may be a dual-homed computer running the Linux operating system located between switch 106 and router 108. The PEP 110 may be responsible for policy enforcement including any combination of the following: network admission control, anti-spoofing, ingress/egress filtering, protecting infrastructure, hiding clients, enforcing server permissions, reporting violations to network operations, detecting policy violations and/or DHCP/DNS relay. A majority of network admission control may be accomplished using the edge switch 106 and the 802.1x security framework. However, conventional 802.1x security framework and automated switch configuration typically do not support IP to MAC address binding. According to embodiments, PEP 110 plays a role in enabling and enforcing MAC address to IP address binding if such services are not available on the switch 106.

Furthermore, the PEP 110 contains (as a result of the network admission process) or retrieves identification information regarding identity, roles, trust, etc. and creates an IBIP packet shim according to example embodiments. The PEP 110 then inserts this shim containing the identity information into appropriate packets in the network 100. Shims are removed by a corresponding PEP 110 prior to a packet being forwarded to a destination as the packet egresses from a network. The shim is discussed in detail below.

The PEP 110 or router 108 may also act as a DHCP or DNS relay. The relay function may be able to perform DHCP or DNS packet conformance tests to prevent malformed packets from reaching the DHCP or DNS server. Thus, according to example embodiments, attacks on DHCP or DNS servers may be mitigated without knowledge of threats or vulnerabilites.

Registration Server (RS)

The RS 112 is responsible for establishing IBIP access control policies for hosts and users seeking access to an IBIP network 100 via a process known as registration. The IBIP registration may include: (1) IBIP host and user authentication, (2) authorization and (3) auto-configuration of network access services. A corresponding de-registration process may handle de-configuration of network access services for an IBIP client when departing from the network 100.

Network Operations System (NetOps)

Figure 2A:
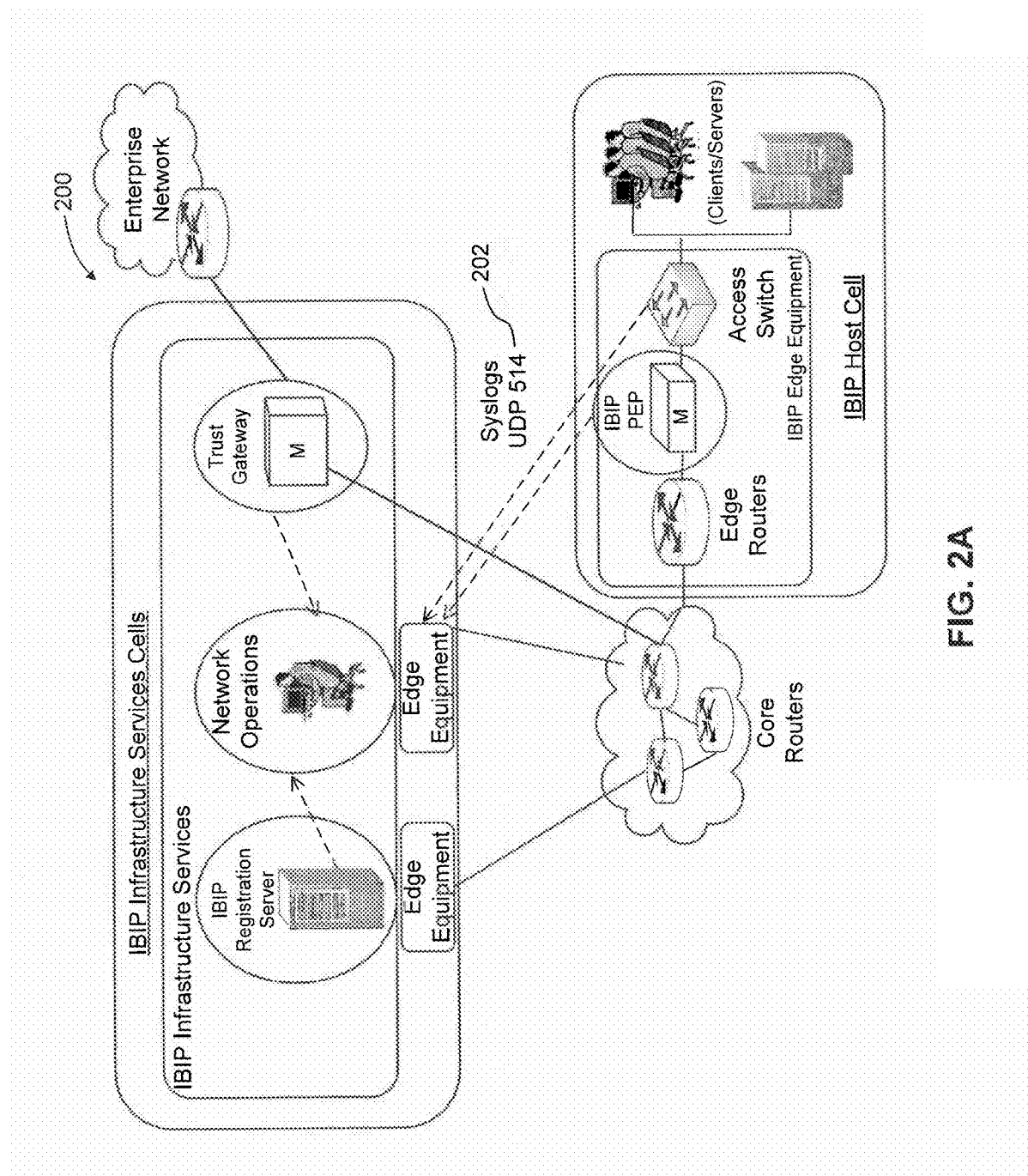
FIG. 2A illustrates a configuration of a Network Operations Server according to example embodiments.
Figure 2B:
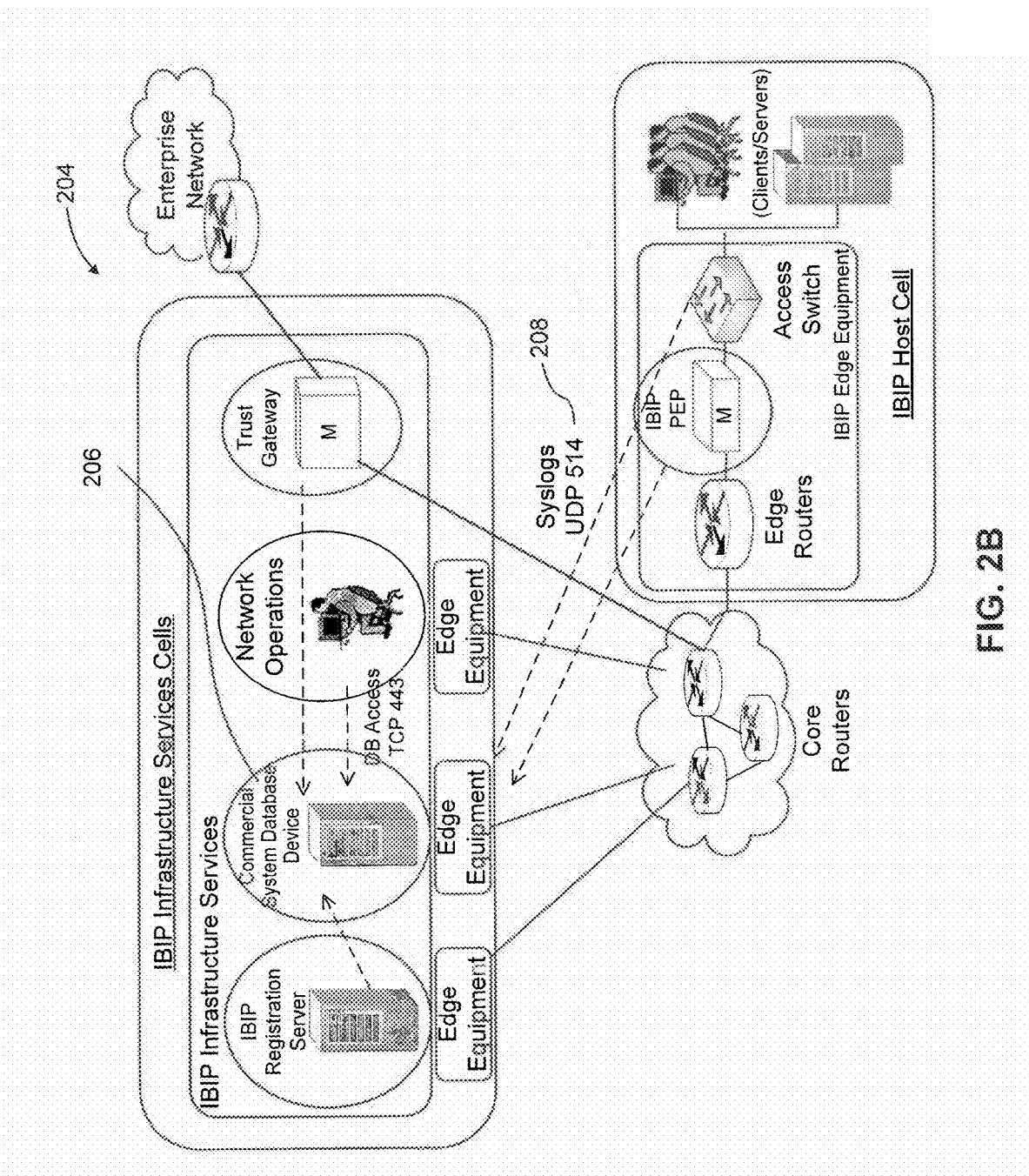
FIG. 2B illustrates an additional configuration of a Network Operations Server according to example embodiments.

The network operations system (NetOps) 114 is a situational awareness sub-system of the IBIP network 100. In example embodiments, the NetOps 114 may include two different exemplary configurations. A first configuration of the NetOps 114 may include a single NetOps server as a system log (syslog) collection and parsing device as shown in FIG. 2A. This first configuration 200 may use IBIP-developed syslog parsing mechanisms and may not provide structured storage of syslogs. As shown at 202, IBIP infrastructure devices may send syslogs to the NetOps server. A second configuration 204 may include integration with a commercial syslog database device 206 that can process standard syslog messages. IBIP devices send standard messages in order to be interoperable with the set of network operations capabilities that can process and manage syslog messages. Thus, IBIP may integrate with existing network operations systems and need not introduce its own network management system. As shown at 208, syslogs from IBIP network infrastructure devices may be sent to the commercial syslog database device 206 as opposed to the NetOps server described in the first configuration.

Such a NetOps system 114 will integrate system log (syslog) messages with an existing network management tool using standard messaging. The syslog messages may provide situational awareness information based on policy violations detected by the PEP 210. The policies and policy violations are described in detail below.

Trust Gateway (TG)

The trust gateway (TG) 116 may provide boundary security services that may be necessary to transition from an IBIP network 100 to a non-IBIP environment outside of the IBIP network 100. This non-IBIP environment may include portions of the network 100 as well as the general Internet.

The non-IBIP environment may be part of the existing non-IBIP enterprise network and may provide a direct connection to the Internet. The TG 116 is also designed to support connection to other TGs via a secure tunneling approach such as IPsec. The trust gateway 116 includes a conventional firewall, an IBIP PEP 110 and a policy monitor. Thus, the TG 116 is a result of tight integration between each of these three sub-modules. As an example, the firewall is expected to provide a stateful firewall and remote access capabilities. The PEP within the trust gateway 116 may function as a PEP described above. However, the PEP in the trust gateway 116 is not part of a local LAN because it serves as a boundary for the IBIP network 100, and thus its LAN is defined as the whole of the non-IBIP environment. For inbound to IBIP traffic, the PEP in the trust gateway 116 will tag an incoming packet with appropriate trust metrics defined by policy. In addition, the policy monitor is able to determine a strength of authentication for a user/host (smart card/TPM: high strength versus username/password/MAC address: low strength) and utilize policy violations associated with any IBIP user/host involved in communicating through the trust gateway 116. Based on analysis, the organization-role-trust-host tag, e.g. ORTH tag may be updated to support real time access control decisions. The ORTH tag is described in depth below. For outbound to IBIP traffic, the PEP in the trust gateway 116 removes identity information from the packet and the firewall may implement network address translation to reflect an appropriate source IP address pool to the non-IBIP network.

Other Servers in IBIP Network

Additional servers of the IBIP network 100 may include DNS and DHCP servers. According to example embodiments, the DNS server may implement a split DNS methodology. Requests to resolve IBIP hostnames from outside the IBIP network 100 may return external, e.g. non-IBIP, addresses. Requests to resolve IBIP hostnames from within the IBIP network 100 will return internal addresses.

According to example embodiments, the DHCP server may be located within the IBIP network 100 with a specifically assigned IP address pool. The address pool of IP addresses may be logically separate from an associated enterprise network, potentially to the point of non-routability, if necessary. IP address assignments may be made as hosts dynamically connect to the IBIP network 100. As noted above, the 802.1x process may successfully complete and the host may request an IP address from the DHCP server via the PEP 110 or router 108 which functions as a DHCP relay. The DHCP will respond with an available address.

Initalization

Prior to registration, IBIP network infrastructure elements, such as routers 108, switches 106 and the RS 112, are to be physically connected and topological relationships are to be entered into the RS 112 database. Furthermore, hosts including clients 102 and servers 104 are to be provisioned with identity credentials and supplicant software. Users are to be enrolled by associating user credentials with a user and establishing any user-unique policies that may be associated with an organization. The above process prior to registration is known as initialization and must also occur when introducing a new piece of infrastructure, user, or server to the IBIP network. Once provisioned, the host and user may move about and attach at any location within the IBIP network enclave that is permitted by organizational policy.

Authentication/Registration

Figure 3:
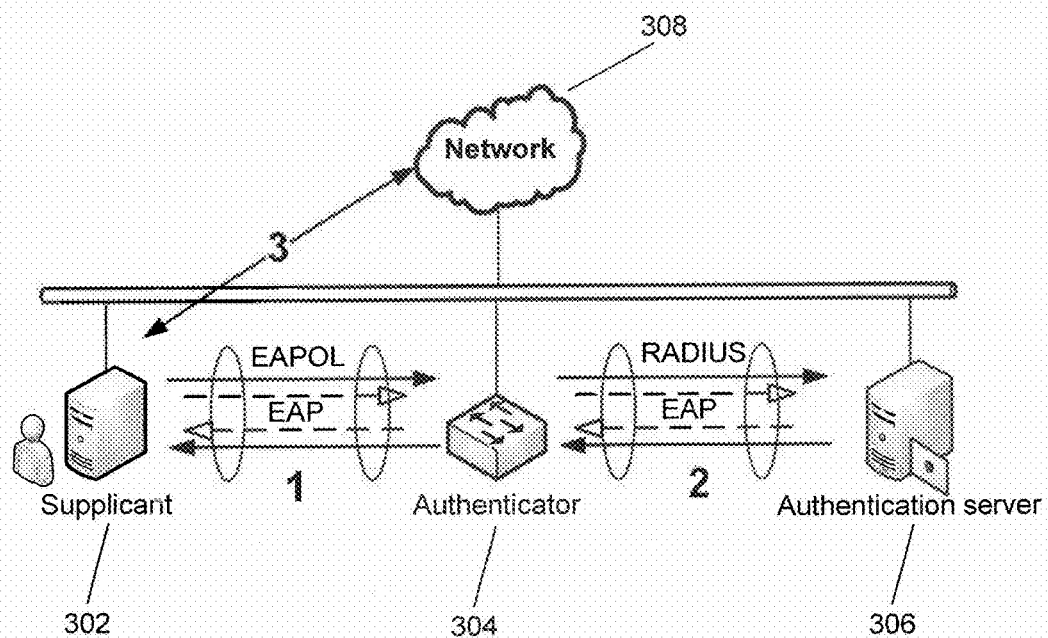
FIG. 3 is a flow diagram of an authentication/registration process according to example embodiments.

According to exemplary embodiments, the IBIP network 100 may use existing and standardized 802.1x security framework with dual certificates (one representing the host and the other representing the user) which provides port based access control to authenticate users before granting access. The 802.1x framework requires a supplicant, an authenticator and an authentication server for access control. According to example embodiments, this framework 300 is shown in FIG. 3. A supplicant 302 first initiates an 802.1x security handshake and communicates with the authenticator 304, which then communicates with the authentication server 306. The supplicant 302 is then granted access to an IBIP network 308.

According to example embodiments, the supplicant 302 is a software client running on an IBIP client's machine. The supplicant 302 authenticates the IBIP client 302 with the authentication server 306 using extensible authentication protocol (EAP). The supplicant 302 presents local host and user credentials to the authenticator 304, which then initiates a secure exchange with authentication server 306. Successful authentication provides notification to authenticator 304 to modify a switch port configuration from "not connected" to a normal network access virtual local area network (VLAN).

In an additional example embodiment, host credentials (single certificate) may be used for an initial network admission decision process to enable the port for network access. The PEP 110 may further restrict full network access (to appropriate authentication services) until user authentication is successful and the PEP 110 loads and enacts policies enforcing normal network access.

The IBIP network 308 may use a combination of host and user identification information, e.g. credentials, and bind the identity information with each network packet that is sent from a given host. According to example embodiments, as noted above, the credentials may be established using dual X.509 certificates on a host, one representing a user and one representing the host, to authenticate with authentication server 306. In addition, according to example embodiments, TPM may be utilized to support host identification using credentials stored on the TPM.

The authentication server 306 is configured to identify all IDs (host or user or combination thereof) that may have privileged access to the IBIP network 308 such as IDs related to NetOps, the Help Desk or InfoSec, discussed below. The authentication server 306 may be configured using a whitelist which may include a list of users/hosts allowed to connect to network 308 and users/hosts which may have privileged special access. The PEP 110 that fronts these special devices will ensure that privileged clients (e.g. sysadmin, NetOps user, help desk, etc.) have permission to access other "hidden" devices or infrastructure devices and will not generate a policy violation. Peer-to-peer applications that are to be permitted by policy will be configured as part of the policies associated with a particular host on which applications run. PEP 110 that fronts for the device will have information loaded shortly after registration and enable these services without restriction. Any agents that are developed to handle approved peer-to-peer applications will need to be started. IBIP agent software may be specifically developed for a given peer-to-peer application to implement unique application oriented policies. The policies may include specific identification of pair-wise peering information such as source and destination IP addresses or dynamically assigned port values used for a given session.

According to example embodiments, IBIP uses an 802.1x supplicant application on an IBIP client or server machine in order to present credentials to the authenticator. This supplicant may be based on open source software or may be part of the software complement that accompanies an operating system. In addition, IBIP may use other user authentication methods (user certificates, web authentication, Windows domain log in, etc.) to obtain user identity information. IBIP does not mandate a methodology for authenticating the user or host, but according to example embodiments, an identity is to be determined in order to complete IBIP registration.

Techniques such as 802.1x, web authentication and MAC authentication bypass are examples of such methods which may be used for determining identities within IBIP. However, IBIP's identity is only as reliable as the trustworthiness of the authentication process used by the enterprise.

The authenticator 304 acts as an agent to assist the supplicant 302 and the authentication server 306 exchange EAP messages. In an embodiment, EAP messages are wrapped with EAP over LAN (EAPOL) protocol. The authenticator 304 and authentication server 306 may encapsulate EAP messages in the RADIUS protocol. According to example embodiments, in the IBIP network 308, the authenticator 304 may be the access switch 106. A state of the switch 106 port may be based on an authentication status. This switch 106 port is unauthorized before a connected IBIP client 102 is fully authenticated. While unauthorized, the authenticator 304 only allows authentication packets to be processed by the switch 106 and proxied to the authentication server. All other packets are dropped. In some cases, host authentication may form the initial basis for network admission (a partial connection). However, the second half of the connection process would be to permit access to appropriate user authentication services. Upon successful user authentication, the full registration process is completed. The switch 106 port and PEP move to a fully authorized state once the connected IBIP client 102 is authenticated (both user and host). While in the authorized state, the authenticator 304 maintains authentication session status and periodically reauthenticates the connected IBIP client 102. The authenticator 304 also monitors activities by the connected IBIP client 102 and will if necessary (and if policies are in place) institute a security violation, which can remove the client 102 and shut the switch 106 port down. In addition, if the client 102 shuts down or physically disconnects from the network, full authentication will be required to gain admission. The authenticator 304 may also reauthenticate the connected IBIP client 102 if an inactivity period exceeds a threshold time. By policy, reauthentication may involve host only, user only, or host and user together.

According to example embodiments, the authentication server 306 validates proof of identification from the IBIP client 102 using agreed authentication schemes. The IBIP registration server 112 includes a RADIUS-based authentication server 306 that authenticates the IBIP client 102 using EAP Tunneled Transport Layer Security (EAP-TTLS). EAP-TTLS authentication includes two phases. In the first phase, the supplicant 302 mutually authenticates with the IBIP RS 112 using the host certificate. In the second phase, EAP-TLS authentication is used. The supplicant 302 and the RS 112 mutually authenticate each other with the user certificate and server certificate using the security tunnel. If both phases pass, authentication is successful and the RS 112 moves into the authorization phase.

If supplicants that do not support dual certificates are in use, the first phase of authentication may be the same as provided above, except that EAP-TLS may be used by using user credentials to gain network access control via standard 802.1x methods. However, because IBIP utilizes hardware identification, a fallback in lieu of TPM or other more secure methods includes using a host network card MAC address as a hardware identifier. At the conclusion of 802.1x with single certificate authentication (based on user credentials), the associated MAC address of the host may be retrieved as part of the process and compared against a registered database of all hosts on IBIP. If the MAC address is found in the database, an associated hardware certificate may be used to derive host identity information in the same manner as the dual certificate approach as described above. Authentication is successful and the RS 112 may move into authorization.

In an alternate embodiment, when supplicants that do not support dual certificates are in use, the first phase of authentication may be same as provided above, except that EAP-TLS may be used by using host credentials to gain network access control via standard 802.1x methods. User authentication may be accomplished by other means, such as web-based authentication, domain login, or other means. If the host and user authentication succeeds, the RS may move into the authorization phase.

Other devices such as printers and host machines that cannot utilize 802.1x and device certificates may be manually registered using MAC addresses as a form of machine identification if other secure forms (such as device certificates) are not available. These machines may not typically have a user associated with them, but could be identified as a service and have a corresponding service ID. These machines are typically also tied to physical ports that are specifically configured to permit these MAC addresses and not require 802.1x authentication. Router 108, switch 106 and other infrastructure may also allow manual registration. According to embodiments, switch 106 may have the ability to transition to MAC authentication bypass (MAB) as an automatic fallback in the event that 802.1x is not supported on a client or if policy allows MAB as an acceptable substitute for host authentication. This may permit network access with no user credentials and no TPM verification, which deploying organizations may consider too great a security risk but may be authorized as a possible fallback.

Authorization

Once the IBIP client 102 is determined to be valid to access the IBIP network, authorization may begin. The IBIP RS 112 determines what types of services the client may access, which part of the network the client may access, when access is allowed, etc. IBIP utilizes role based network access policies to manage access control. RS 112 retrieves user-to-role mapping and role-to-policy mapping from the local IBIP policy database (not shown). This user-to-role and role-to-policy mapping is optional and can be incrementally implemented over time. It is possible to grant access policies at a granular individual user or host level. However, a higher level of differentiation at the organizational level is possible (as represented by the O in ORTH). This allows for a more scalable and manageable solution. In addition, the RS 112 provides an API to connect to external sources such as LDAP and activity directory servers. The RS 112 creates a policy implementation plan for required IBIP components. The RS 112 and associated IBIP components may also support multiple policies for different threat conditions. According to example embodiments, five threat conditions from normal to severe are supported with a given set of policies established for each threat condition. As the threat condition changes (manually through operator input or automatically via policies that may be established), the authorization policies may change dynamically. Typically, such policies for a given situation are pre-tested, pre-approved, and pre-loaded such that a triggering event can cause the policy to be enacted rapidly.

During authorization, the RS 112 refers to policy information that may establish network services for the user, host, organization, role or trust level. The policy information may be stored in a local policy database, in an Active Directory or in both. During auto-configuration, the RS 112 may configure different network components according to the policies governing network services. The RS 112 may configure each of a DHCP server, a DNS server, an edge router 108, an access switch 106 and a PEP 110.

Normal User

According to example embodiments, a user of an IBIP network may have a role as a "normal" user or a "privileged" user, described below. While these two examples ("normal" and "privileged") are discussed in detail, IBIP supports the ability to designate a plurality of roles (e.g. hundreds, if desired) with each role having specific access authorization. A given role may also be dynamically modified in near real-time with a corresponding access control enforced within seconds of such changes.

A "normal" user is allowed to send and receive data on the IBIP network according to their role and based on policies, but does not have special access privileges such as a user with InfoSec or Help Desk privileges. According to additional embodiments, user authentication may involve Smart-Card technology, and it may be possible to determine during re-authentication whether a badge is inserted. Policies may be applied to attended (badge in slot) or unattended (badge not in slot) operations. Example constraints on "normal" users that may be established by an organization include restrictions on the ability of the users to port scan another machine or ping a router or infrastructure device. In addition, the end user might not be able to conduct traceroute because this involves receiving packets from infrastructure devices. However, IBIP is not limited to these examples of access privileges.

Privileged User

NetOps users and other users such as InfoSec or Help Desk operators are known as special or "privileged" users and are categorized into special categories of users or roles because they will require access privileges which extend beyond "normal" users. In addition, certain machines may need to have special privileges. Thus, IBIP architecture permits special access privileges which may be granted based upon user or host authentication or escalation to a different role based on authentication and approved authorization to transition to a given role. As an example, a user may need to utilize a specific host to be provided full privileges and may have direct access to all hidden clients and infrastructure devices for remote management or assistance as may be deemed appropriate.

Appropriate credentials (user, host or user/host combination) may be preapproved within RS 112 such that when access is necessary the PEP 110 may be aware of privileges for the user, host or user/host and may enforce a policy, discussed below. From the perspective of the NetOps user, he or she may log in and will experience no fundamental differences. If a NetOps user is required to utilize a specific machine, the user will not be allowed to violate such a policy. Violation of the policy will be detected and logged.

Reduced Threat Surface

According to exemplary embodiments, once users are connected to the IBIP network 100, the IBIP network 100 limits access to end-user systems (clients) while permitting full visibility of servers. In effect, client or user workstations, routers, switches and NetOps servers are "hidden." All "hidden" clients have source IP addresses which are not accessible within the network by another machine (client or server) without a "need-to-know." Such a "need-to-know" may be temporary such as when a server needs to be able to communicate back to a client that initiated communication or permanent such as for generally accessible servers. However, types of access may be limited by a permissible use policy described further below.

In order to accommodate authorized peer-to-peer (P2P) applications such as VoIP and other collaboration tools, workstations, handsets or devices may be preregistered to provide authorized P2P applications. This preregistration may also be used for Help Desk operations, etc.

IBIP Shim

Figure 4:
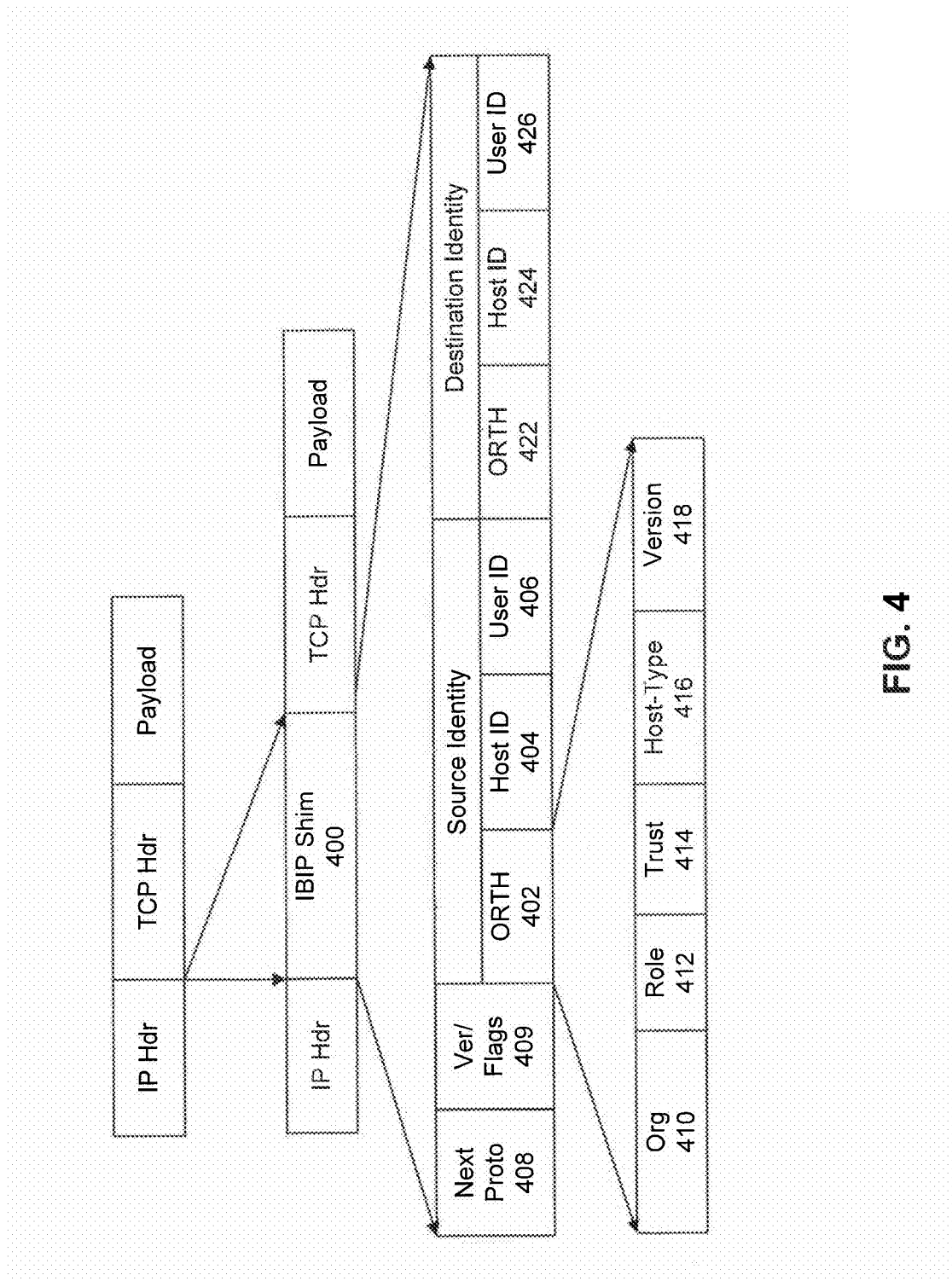
FIG. 4 is a diagram of an IP IBIP packet including a shim according to example embodiments.

According to example embodiments, as shown in FIG. 4, an IBIP shim 400 is defined and inserted into packets being transmitted within the IBIP network by PEP 110.

According to embodiments, the IBIP shim 400 is a transport layer protocol that sits between an IP header and other transport protocol headers such as TCP or UDP or any other standard IP payload. Thus, according to example embodiments, each packet includes a header, a shim 400 and a payload which may be a transport layer header and its subsequent payload. The IBIP IP shim 400 is 30 bytes in length and comprises the following fields listed in order of transmission (first field listed is transmitted first, in network byte order): A 8-bit next header field 408 identifies a type of transport header immediately following the IBIP IP shim. In IPv4, this field is known as the protocol field. In IPv6, this field is known as the next header field. The values of the next header field 408 are the same as those used in the IPv4 protocol field. After the next header field 408, a 16-bit version/flag field 409 is provided. The 16-bits that comprise the version/flag field 409 may be set to zero or may include additional information about a shim version or flags associated with remaining shim subfields. After the version/flag field 409, a source identity field is provided which is 112 bits in length, and includes the following sub-fields: ORTH 402 which includes 16 bits for Organization 410, 8 bits for Role 412, 3 bits for Trust 414, 2 bits for "host-type" 416 that indicates whether a host is hidden, not hidden or a hybrid, 3 bits for namespace version 418, 40 bits for Host Identity 404 and 40 bits for User Identity 406. Namespace version 418 allows different interpretations of the host and user identity subfields. For example, one version may accommodate using the 40 bits based on Department of Defense (DOD) common access card naming convention while another version may be applicable to non-personnel entity identifier (NPE-ID). After the source identity field, a 112 bit destination identity field is provided which may have the same sub-fields as the source identity field, e.g. ORTH 422, Host ID 424 and User ID 426.

Packets that are sent to and from hosts in the IBIP network include this IBIP shim 400 and thus are 30 bytes larger. In other words, each packet has a length equal to the length of the original packet plus the length of the shim (30 bytes). However, the shim 400 is not limited to the above example fields and corresponding organization and further embodiments may adjust the size/organization of the fields in the shim to meet the needs of a particular enterprise.

For non-IBIP enterprise and Internet destinations, shim 400 information may be pre-defined because these destinations do not participate in registration and IBIP network admission. However, for internal IBIP destinations, identity information is available in the RS 112 as noted above. Every client and server that successfully registers will have identity information loaded in the PEP 110 upon conclusion of registration. Thus, this shim data will be pre-staged for insertion by the PEP 110 upon receipt of a packet. However, for destinations that are not local to the PEP 110, the PEP may query the RS 112 to receive credential information for the destination field of the shim header. If shim data is available for the destination, the requesting PEP may construct a shim header with identity attribute data for both source and destination and may cache the destination identity attribute data for subsequent use. The lifetime of the cached destination identity attribute information may be configured per policy.

The role 412 and the trust metric 414 may be dynamically updated in response to an event. A policy may be applied to the source ID or destination ID depending upon a nature of an access control policy. Subsequent examples may use source designation (ORTH 402 or role 412) but may also be applicable to destination designation (ORM 422). Updates of the role 412 and the trust metric 414 may trigger filtering which may cause a packet to be dropped by the PEP 110. In addition, additional actions may be triggered. As an example, the role 412 of a user may change from "normal user" to "tier 3 super user" which may allow the user to provide extraordinary support to HelpDesk operators. Such an upgrade in the role 412 may enable the user to access a client machine or network infrastructure in order to carry out necessary tasks. These tasks would have triggered a policy violation under normal circumstances, had the role 412 of the user not been changed from "normal user" to "tier 3 super user."

Additionally, if the change in role 412 is no longer necessary, the role 412 may be modified from "tier 3 super user" back to "normal user."

Policy Maintenance

According to example embodiments, a policy maintainer may be responsible for establishing and maintaining IBIP policies. IBIP utilizes, but is not limited to, a role based access control model with two tiers of mappings: user to role 412 and role 412 to policy. IBIP may utilize a local relational database stored in PEPs to hold organization and policy information. User information may be stored in the database organization tables. An organization may be in a hierarchical format and may have an organization tag 410 associated with the organization. The organization information may be used to access applicable policy information.

A policy implementation plan is a configuration file that is automatically generated by the RS 112 for the specific IBIP network components according to a client machine's policy. As an example, for a router 108, the implementation plan is a router configuration file which may be loaded in memory in the router. For the PEP 110, the implementation plan is a command script which may be loaded in memory in the PEP 110 and executed remotely to update the PEP 110.

Applying Policies

According to example embodiments, IBIP introduces policies and failure to abide by such policies may constitute policy violations. Policies allow hosts and users to be held accountable based on their identity as represented in the IBIP shim 400. The identity may specify a user, a host, organization, role and trust level, and these factors may be represented in the IBIP shim 400 as noted above. In combination, this identity information enables a synergism between identity, policy, policy violation and situational understanding by the IBIP network 100.

Policies may be defined and applied in a hierarchical manner, with a subordinate organization inheriting the policies of superior organizations and implementing supplementary policies as needed. This greatly simplifies a technique known in the Army as "Task Organization," in which a unit from one organization is assigned to a different organization to support a mission. For example, a Radio Company from Brigade A may be assigned to Brigade B by simply causing it to inherit Brigade B's policies. All equipment in the company may be updated by a single assignment action which causes network access policies associated with Brigade B to be applied to the radio company in transition. The next time that a user from the radio company logs into the IBIP network, the user will now be part of Brigade B and have an IP address associated with that organization as well as all approved access policies for Brigade B.

If a user is reassigned to a new organization, host ID 404 and user ID 406 in the shim 400 will remain constant, but the organization tag 410 associated with the user will be modified to reflect a new organizational hierarchy. Reassignment of a radio company may be accomplished using a user interface according to example embodiments. As an example, an Organizational View of the IBIP network may be presented in addition to a Network Topological View on a display. The Organizational View allows changes in organizational entities using a simple click-and-drag interface. Reassignment of Radio Company to Brigade B may be accomplished through a single mouse action that applies to the entire company. This action causes all systems associated with that company to be updated with policies associated with Brigade B, which may include re-addressing all systems within that Company. The organization tag 410 that is specific to an organization allows creation of access control policies that are specific to the organization.

Policies that apply to the IBIP network are stored in a database in the PEP 110. The PEP 110 may implement ingress as well as egress filtering based on the policies in the PEP 110. Ingress is defined in this context as a direction toward a network core, while egress is defined as a direction toward a destination host. Both ingress and egress policies may be created in the RS 112 and pushed to the PEP 110 as necessary. Policies that are created as part of registration or authentication may be pushed automatically to the PEP 110 associated with a device and user that registered. In addition, static policies may be created and pushed out as necessary. In example embodiments, some of the static policies may be automatically pushed to PEPs 110 at the time when a PEP 110 is initialized or reinitialized and remain in force until changed by the RS 112. According to example embodiments, IBIP allows for the creation and enforcement of these policies, but there is no requirement that any policy exist. Examples of policies and violations are provided below.

IBIP places no inherent restrictions on a minimum or maximum number of policies that may be imposed on an individual IBIP host and user or on the system as a whole, although particular embodiments may have such limitations as a result of capacity limitations of equipment used.

As an example, a policy may prevent access to IBIP network infrastructure equipment, such as routers and bridges by users that do not have privileged access permissions.

Under such a policy, the PEP 110 will prevent direct access to IBIP network infrastructure such as a router 108 even if a user has access to router passwords. The trust tag 414 may also be configured in the IBIP shim 400 to provide a real time trustworthiness status.

A machine connected to IBIP network 100 may also be "hidden" according to the host-type subfield 416. If the host-type subfield 416 is set as hidden, then according to policies, a hidden machine may not communicate with another hidden machine. However, according to policies, communications can occur between a hidden machine and a non-hidden machine, i.e. a server, if and only if the hidden machine initiates the communication. Most servers will have their host-type set as visible.

The policies will prevent a server from communicating with the hidden machine if no prior communication arrives from the hidden machine. In other words, a hidden client machine communicating with the server establishes a "need to know" state for the server. This state may be refreshed for a duration of the dialog between client and server, but may expire after a configurable period of inactivity. The PEP 110 maintains the lifetime so that a return packet may be sent back to the client machine. If a host is a server, then a user ID 406 is replaced with a service ID which may be associated with a set of permissible use policies. As an example, a web service may accept incoming connections on TCP ports 80 and 443. After the registration process successfully completes, the RS 112 may configure the PEP 110 with the permissible use policy and not allow the server to accept TCP connections on any port except 80 or 443. If the server attempts to operate like a client browser or use any other unapproved port, the PEP 110 will detect the policy violation, drop the packet and will inform NetOps 114 via a syslog message that indicates host and credential information associated with the violation. The machine that committed the policy violation will be logged.

A third host-type, "hybrid," is provided. This designation accounts for a client host that includes "services" that may be accessible to other hosts (e.g., a client that runs a specific server or servers). Access to these services may still be controlled through appropriate access control filters or via approved roles, or other mechanisms allowed via enforcement by IBIP. The hybrid mode may allow constraints on the client side as well as the server side. Hybrid mode may also be applicable to certain P2P applications. At certain heightened threat conditions, the server side "services" may be blockable by policy if an active threat vector exists that could exploit such services.

The PEP 110 carries out access control filtering based on identity attributes using the shim 400 and existing policies associated with the PEP 110. If a policy is violated, such as when a client attempts to send a packet to another client, a policy violation is generated and a syslog is sent to the NetOps system 114. This policy violation may be generated by the PEP 110. Thus, all policy violations are syslog'ed and stored on the NetOps server 114 where user and host attribution may be conducted in real time. No offline forensic analysis is required.

Policy Violations

If a policy for a given user, host, role or trust value is violated, a cause of the violation may be identified as well as attribution information. If an entity continues to commit policy violations, further policies could be implemented to downgrade the trust level of a host or user or both. This downgrade in the trust level may lead to an automatic notification of an event to an administrator, removal of a host or user from the network 100 or an automated generation of a trouble ticket requiring resolution before reinstating a trust level prior to the violation.

Additionally, the user may be required to re-authenticate credentials as a result of the downgrade in the trust level. This could cause the role to be dynamically modified to a different level such as "isolated." An "isolated" role level may cause an associated host to only be accessible by a HelpDesk and only allow the "isolated" host to send and receive packets from the HelpDesk. Thus, servers may have policies which prevent any client machine or user having a trust level less than a preset level from communicating with the servers. Thus, the network 100 is able to defend itself in real-time from policy violations without human intervention and alert the NetOps 114 to follow-up and take action.

Upon violation of policies, syslog messages may be generated. The syslog messages may be sent to the NetOps system 114 and stored in a database that may be later queried to detect anomalous or malicious activities. The resulting messages include user and/or host identity information which may allow real time attribution. Server hosts will typically not have user-based attribution associated with network traffic. Traffic captured from multi-user (single user at a time) hosts will have user attribution that is associated at network admission. Data mining for below-the-threshold activities that may be representative of certain advanced persistent threats may be detectable. As an example, one ping per hour from a compromised host to conduct a network scan that may take days to complete would become very visible using IBIP's NetOps 114. This single ping may be difficult to notice in a conventional network.

There are many example activities which may generate policy violations: (1) a client attempting to communicate with another client (unless preapproved P2P), (2) a server attempting to communicate with another client for which there was no prior client initiated contact with the server within a given time frame, (3) an end host (client or server) attempting to communicate with any infrastructure device (router or switch), (4) a server approved to receive connections on TCP ports 80 and 443 (web services) attempting to use any other source ports (such as another server application, a "back door" or any client initiated ephemeral port usage), (5) a packet with a given organization tag (representing organization A) attempting to transit past a PEP (protecting organization B) when there is an egress filter against organization tag A that prevents organization A from talking with organization B, (6) a user/host attempting (unsuccessfully) to modify its MAC address or IP address, (7) a user using a credential in use elsewhere (wherein the credential is not permitted to be used in multiple locations at a time), (8) a privileged user (i.e. NetOps) attempting to reconfigure an infrastructure device (router) from an unapproved host machine using valid NetOps user credentials (username and password, etc.) and (9) a user trying to configure an infrastructure device from an approved NetOps host machine without having valid credentials to carry out the task (only having "regular user" credentials). Policy violations are not limited to these examples.

In addition, according to example embodiments, IBIP allows for the creation and enforcement of these policies, but there is no requirement that any policy exist.

System Dynamic Reconfiguration

According to example embodiments, network access permissions and restrictions placed on a user and host may fluctuate as a function of a threat condition of the network. The IBIP network 100 may include a number of "Information Condition" (InfoCon) levels which provide policy maintainers an opportunity to set different network access policies for different threat conditions. As an example, in order of increasing threat the InfoCon levels may include "Normal," "Alpha," "Bravo," "Charlie" and "Delta." Policies for each of these levels may be pre-defined and auto-configured by the IBIP network 100, and a set of policies associated with the threat level may be set based on a current InfoCon level. Network access permissions and restrictions that implement policies for the InfoCon levels may be in each configured device so that a change to the InfoCon level may be acted upon with a minimum of delay or induced network traffic.

According to embodiments, the Trust Gateway 116 may monitor the ORTH tag 402 in the shim 400 in real time. According to embodiments, the ORTH tag 402 may include a dynamic trust value 414. A packet may either be coming from or in transmission to a non-IBIP host. If that is the case, the shim 400 associated with a non-IBIP host (upon entering the IBIP environment) may include the dynamic trust value or metric 414. The trust metric 414 may be assigned in real time by the trust gateway 116 based on initial conditions. The trust gateway 116 may also know which IBIP host is involved in a related communication and may check policy violation or trust metric status of the host or user. If there are unresolved policy violations taking place or there is a history of periodic violations over a longer period of time (and the ThreatCon is not normal), a trust metric 414 may be modified such that the PEP 110 applying the egress filter policy would block all packets having a trust metric 414 below a certain threshold. In addition, the trust gateway 116 provides access outside of the IBIP network 100. Thus, according to embodiments, the TG 116 will block all unsolicited incoming packets. It is also possible to have the trust gateway 116 act as an enterprise boundary by analyzing authentication factors including biometrics, username/password in making its determination whether to permit network access.

Strength or quality of authentication methods used may influence the trust metric from packets originating from outside the IBIP network. For packets that are returning from an IBIP host-initiated query (e.g., out to the Internet), there may be little or no trust in such return traffic. For traffic coming from a trusted host and trusted user using strong authentication methods, incoming packets may have the same inherent trust value as an internal-to-IBIP environment. Factors such as time of day, remote access location, reputation services, authentication methods, access to specific internal systems and other factors may influence trust metrics or other access control decisions at the TG 116.

Federated Enclaves

According to further embodiments, RS 112 may act as a standalone server. However, as an example, the RS 112 may be able to coordinate reachability between enclaves. It may be possible to incorporate a hierarchical relationship in an enterprise, where policies may be inherited from top to bottom in an enterprise. Lower echelons may have additional policies as long as there is no conflict with the upper policies. In addition, it may be possible to incorporate a peer-to-peer partial or full mesh relationship to coordinate reachability between enclaves.

Example Flowcharts

Figure 5:
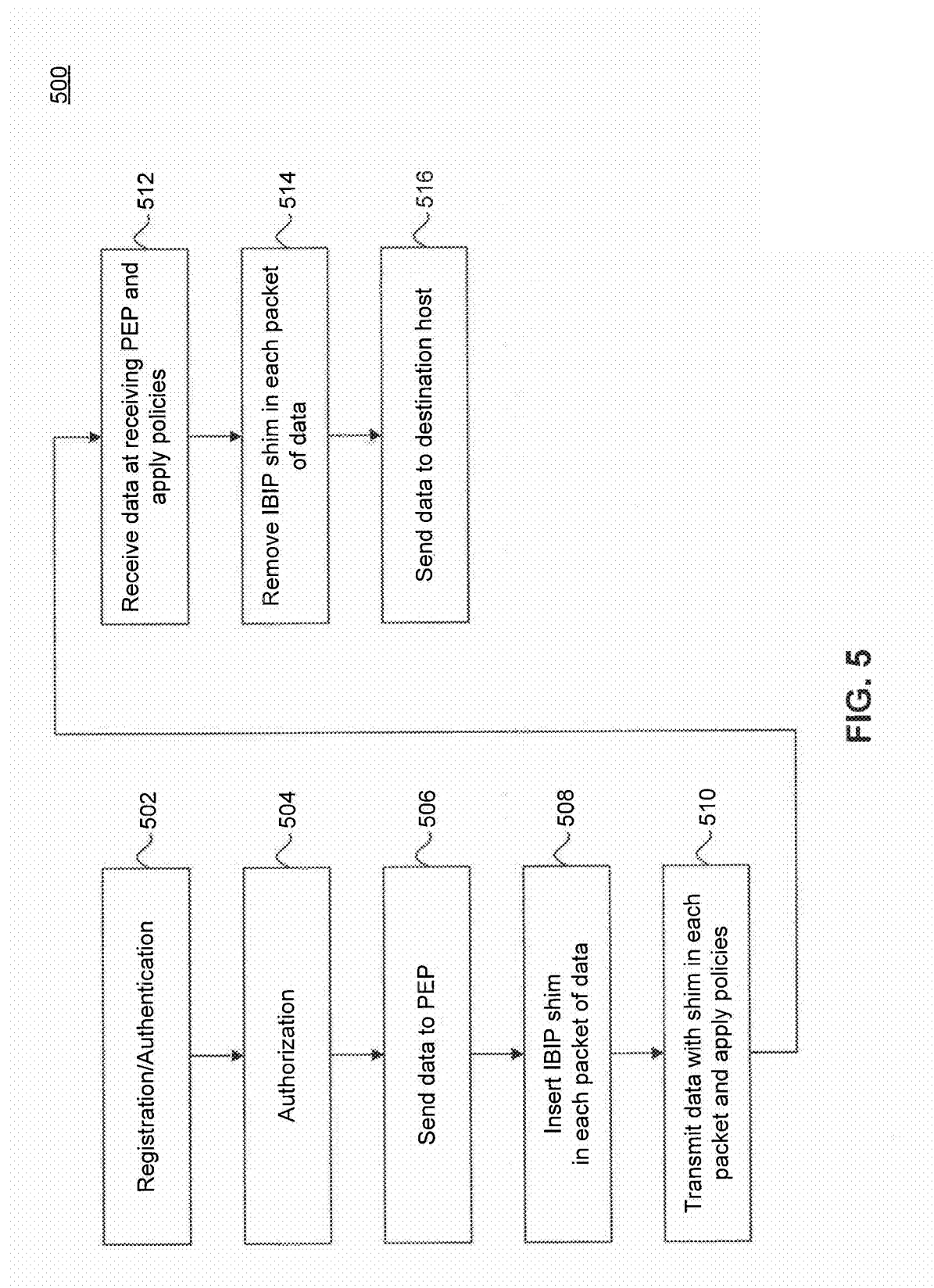
FIG. 5 is a flowchart for transmitting a packet in an IBIP network according to example embodiments.

FIG. 5 is a process flowchart for transmitting a packet in an IBIP network according to example embodiments.

As shown in FIG. 5, process 500 begins at 502, which includes authentication as part of the registration process. A device that is connecting to an IBIP network is first authenticated. In step 502, the device presents host and user credentials to an authentication server for authentication.

In step 504, the device is authorized to communicate on the IBIP network. In other words, registration server determines what types of services a user/host may access, which part of the network the user/host may access, when access is allowed, etc.

In step 506, the connected device sends data to another device which may be part of the IBIP network or outside of the IBIP network.

In step 508, PEP inserts a shim 400 into each packet of the data as shown in FIG. 4. The shim may represent organization information, role information, trust metric information, a host-type indicator as to whether the host is hidden, not hidden, or hybrid, a host ID and a user ID. Server hosts would not typically have a user ID and may optionally use a service ID if appropriate. This shim information is applicable to both the source and destination. If the destination is not an IBIP host, pre-designated shim content may be used to identify non-IBIP destinations.

In step 510, the data within the shim in each packet is evaluated against any ingress policies and if permitted onto the network, the packet with the shim is then transmitted toward the recipient device.

In step 512, the data arrives at a destination PEP and egress policies will be applied. If a source is a client and the destination is a server, a "need-to-know" state may be created to permit the server to communicate back to the client. The server may then communicate back to the client within a preset timeframe configurable for each server.

In step 514, the PEP removes the shim and reconstitutes the packet back to its original form less any normal transitional changes such as decrementing a time-to-live (TTL) value. The destination host will have no knowledge of IBIP processing.

In step 516, the PEP forwards the packet toward the destination host.

Figure 6:
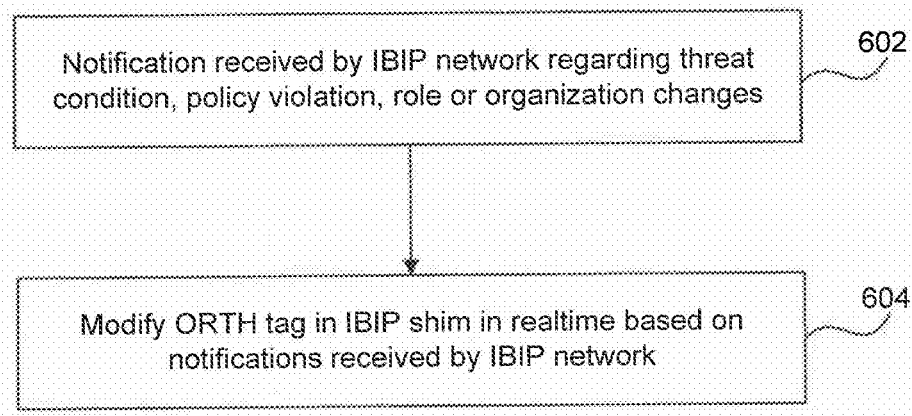
FIG. 6 is a flowchart for modifying an IBIP shim according to example embodiments.

FIG. 6 is a process flowchart for modifying the IBIP shim 400 shown in FIG. 4 according to example embodiments.

As shown in FIG. 6, process 600 begins at 602, where a notification is received by IBIP network (specifically the RS 112) regarding a change in a threat condition, a change in role information, a change in organization information, or a policy violation is detected by a PEP.

After step 602, notification information may be passed from the RS 112 to the PEP 110 so that step 604 may be carried out. The RS 112 sends updated information to the PEP 110 regarding changing conditions. Thus, according to example embodiments the RS 112 is responsible for changing shim content and the PEP 110 is responsible for carrying out policy changes.

In step 604, an associated IBIP shim 400 in packetized data is modified in real time to reflect changes in the threat condition, role changes, organization information changes or detected policy violations based on disclosed embodiments herein. Thus, the threshold for accepting a minimum trust metric for access 414 may be changed based on a change in the threat condition, role information 412 or organization information 410 and enable the IBIP network to adapt to changing conditions. An abnormal occurrence of policy violations within a short time frame could trigger an automatic escalation of the threat condition allowing the network to modify its policies without human intervention.

Conventional networks are unable to adapt to such changing conditions and are unable to stop or dynamically isolate bad actors, including users of a network from harming their own network, as provided herein.

Example Computer System Implementation

Figure 7:
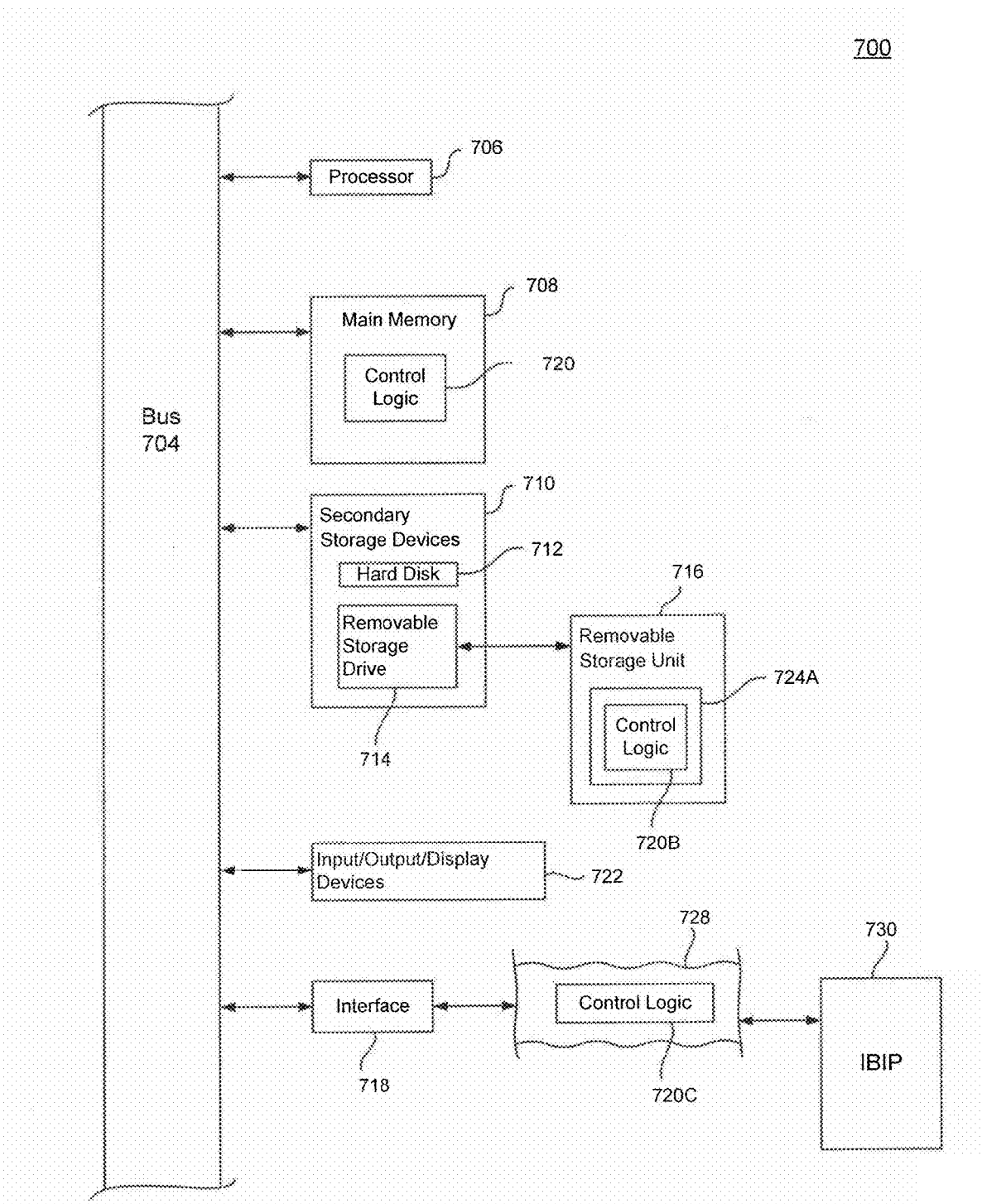
FIG. 7 is an example computer system capable of implementing example embodiments or components thereof.

Embodiments described herein can be implemented using software, firmware, hardware, or a combination thereof. FIG. 7 illustrates an example computer system 700 in which embodiments, or portions thereof, can be implemented as computer-readable code. For example, the methods illustrated by processes 500 and 600 can be implemented in system 700. However, after reading this description, it will become apparent to a person skilled in the relevant art how to implement embodiments using other computer systems and/or computer architectures.

Computer system 700 includes one or more processors, such as processor 706. Processor 706 can be a special purpose or a general purpose processor. Processor 706 is connected to a communication infrastructure 704 (for example, a bus or network).

Computer system 700 also includes a main memory 708 (e.g., random access memory (RAM)) and secondary storage devices 710. Secondary storage devices 710 may include, for example, a hard disk drive 712, a removable storage drive 714, and/or a memory stick. Removable storage device 714 may comprise a floppy disk drive, a magnetic tape drive, an optical disk drive, a flash memory, or the like. Removable storage drive 714 reads from and/or writes to a removable storage unit 716 in a well-known manner. Removable storage unit 716 may comprise a floppy disk, magnetic tape, optical disk, etc. which is read by and written to by removable storage device 714. As will be appreciated by persons skilled in the relevant art(s), removable storage unit 716 includes a computer usable storage medium 724A having stored therein computer software and/or logic 720B.

Computer system 700 may also include a communications interface 718. Communications interface 718 allows software and data to be transferred between computer system 700 and external devices. Communications interface 718 may include a modem, a network interface (such as an Ethernet card), a communications port, a PCMCIA, slot and card, or the like. Software and data transferred via communications interface 718 are in the form of signals which may be electronic, electromagnetic, optical, or other signals capable of being received by communications interface 718. These signals are provided to communications interface 718 via a communications path 728. Communications path 728 carries signals and may be implemented using wire or cable, fiber optics, a phone line, a cellular phone link, an RF link or other communications channels.

In this document, the terms "computer usable medium" and "computer readable medium" are used to generally refer to media such as removable storage unit and a hard disk installed in hard disk drive 712. Computer usable medium can also refer to memories, such as main memory 708 and secondary storage devices 710, which can be memory semiconductors (e.g. DRAMs, etc.).

Computer programs (also called computer control logic) are stored in main memory 708 and/or secondary storage devices 710. Computer programs may also be received via communications interface 718. Such computer programs, when executed, enable computer system 700 to implement embodiments as discussed herein. In particular, the computer programs, when executed, enable processor 706 and IBIP Application 730 to implement the processes of the present embodiments. Where embodiments are implemented using software, the software may be stored in a computer program product and loaded into computer system 700 using removable storage drive 714, interface 718, or hard drive 712.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
receiving, by a processor, an IP packet entering a network for processing by a first protocol;
inserting, by the processor, an identity-based internet protocol (IBIP) shim between a header and a body of the IP packet; and
incorporating, by the processor, a role of a source and a destination of the IP packet in the shim;
dynamically modifying, by the processor, the role of the source of the IP packet from a first role to a second role, wherein both the first role and the second role correspond to processing by the first protocol.

2. The method of claim 1, further comprising:
escalating privileges of a user corresponding to the second role including additional access to resources.

3. The method of claim 1, further comprising:
de-escalating privileges of a user corresponding to the second role including reduced access to resources.

4. The method of claim 1, further comprising:
incorporating a trust value of the source and the destination of the IP packet in the shim, wherein the trust value is assigned by a gateway device based on one or more initial conditions.

5. The method of claim 4, further comprising:
dynamically modifying the trust value of the source or the destination of the IP packet in the shim based on identification of a policy violation associated with a user.

6. The method of claim 1, further comprising:
incorporating a host ID of the source and the destination of the IP packet in the shim, wherein the network does not allow anonymous traffic.

7. The method of claim 1, further comprising:
incorporating a user ID or service ID of the source and the destination of the IP packet in the shim, wherein the network does not allow anonymous traffic.

8. The method of claim 1, further comprising: establishing a policy regarding ingress or egress of the IP packet; determining a violation of the policy; and removing a user and/or a host associated with the violation from the network.

9. The method of claim 8, further comprising:
reauthenticating the user associated with the violation of the policy; and
reassigning the role of the source of the IP packet as isolated.

10. The method of claim 1, further comprising:
establishing a threat level of the network and enforcing an alternate policy responsive to the shim and the threat level.

11. The method of claim 1, wherein the IP packet is one of an IPv4 and an IPv6 packet.

12. The method of claim 1, wherein the role of the source corresponds to a role of a user based on a username associated with the user and a MAC address for hardware authentication.

13. The method of claim 1, further comprising:
dropping the packet responsive to the modifying of the role to the second role.

14. The method of claim 1, further comprising:
dynamically modifying the role from the second role back to the first role.

15. A non-transitory computer-readable storage medium having computer-executable instructions stored thereon that, in response to being executed by a computing device, cause the computing device to perform operations comprising:
receiving an IP packet entering a network for processing by a first protocol;
inserting an identity-based internet protocol (IBIP) shim between a header and a body of the IP packet; and
incorporating a role of a source and a destination of the IP packet in the shim;
dynamically modifying the role of the source of the IP packet from a first role to a second role, wherein both the first role and the second role correspond to processing by the first protocol.

16. The non-transitory computer-readable storage medium of claim 15, the operations further comprising:
escalating privileges of a user corresponding to the second role including additional access to resources.

17. The non-transitory computer-readable storage medium of claim 15, the operations further comprising:
de-escalating privileges of a user corresponding to the second role including reduced access to resources.

18. The non-transitory computer-readable storage medium of claim 15, the operations further comprising:
incorporating a trust value of the source and the destination of the IP packet in the shim.

19. The non-transitory computer-readable storage medium of claim 18, the operations further comprising:
dynamically modifying the trust value of the source or the destination of the IP packet in the shim.

20. The non-transitory computer-readable storage medium of claim 15, the operations further comprising:
establishing a policy regarding ingress or egress of the IP packet;
determining a violation of the policy; and
removing a user and/or a host associated with the violation from the network.

21. The non-transitory computer-readable storage medium of claim 15, the operations further comprising:
establishing a threat level of the network and enforcing an alternate policy responsive to the shim and the threat level.

22. The non-transitory computer-readable storage medium of claim 15, wherein the IP packet is one of an IPv4 and an IPv6 packet.

23. A system, comprising:
an IP communication network;
a policy enforcement point configured to receive an IP packet entering the IP communication network for processing by a first protocol, insert an identity-based internet protocol (IBIP) shim between a header and a body of the IP packet and incorporate a role of a source and a destination of the IP packet in the shim, dynamically modify the role of the source of the IP packet from a first role to a second role, wherein both the first role and the second role correspond to processing by the first protocol, and receive the IP packet with the IBIP shim when the IP packet is exiting the IP communication network, process the shim, enforce ingress and egress policies and remove the shim; and
a host device, including a processor, configured to receive the IP packet forwarded from the policy enforcement point responsive to the shim.

24. The system of claim 22, further comprising:
a firewall configured to communicate with the policy enforcement point; and
a policy monitor configured to enforce the ingress and egress policies.

25. The system of claim 23, wherein the IP packet is one of an IPv4 and an IPv6 packet.

26. A method, comprising:
receiving, by a processor, an IP packet exiting a network;
interpreting, by the processor, an identity-based internet protocol (IBIP) shim between a header and a body of the IP packet, the IBIP shim including an identity of a source and a destination of the IP packet;
enforcing, by the processor, egress policies according to a policy monitor;
removing, by the processor, the IBIP shim from the IP packet; and
forwarding the IP packet without the IBIP shim toward the destination.

27. The method of claim 26, wherein the IP packet is one of an IPv4 and an IPv6 packet.

28. A method, comprising:
receiving, by a processor, an IP packet entering a network for processing by a first protocol;
interpreting, by the processor, an identity-based internet protocol (IBIP) shim between a header and a body of the IP packet, the IBIP shim including a role of a source and a destination of the IP packet, wherein the role has been dynamically modified from a first role to a second role, wherein both the first role and the second role correspond to processing by the first protocol;
determining, by the processor, a strength of authentication of the source of the IP packet;
enforcing, by the processor, ingress policies according to a policy monitor; and
forwarding the IP packet including the IBIP shim toward the destination.

29. The method of claim 28, further comprising:
modifying a value of an organization-role-trust-host (ORTH) tag within the IP shim based on the trust metric value.

30. The method of claim 28, further comprising:
determining that the trust metric value is high responsive to smart card or trusted platform module (TPM) source authentication and that the trust metric value is low responsive to username, password and MAC address source authentication.

31. The method of claim 28, further comprising:
establishing a connection to a remote trust gateway by tunneling to provide authentication and encryption services.

32. The method of claim 28, wherein the IP packet is one of an IPv4 and an IPv6 packet.

* * * * *